June 1, 1926.

V. D. WHITE

TRACTION BELT MECHANISM

Filed Sept. 9, 1924   3 Sheets-Sheet 2

Inventor:
Virgil D. White,
by Emery, Booth, Janney & Varney,
Attys.

Patented June 1, 1926.

1,587,262

UNITED STATES PATENT OFFICE.

VIRGIL D. WHITE, OF WEST OSSIPEE, NEW HAMPSHIRE, ASSIGNOR TO SNOWMOBILE COMPANY, OF ROCHESTER, NEW HAMPSHIRE, A CORPORATION OF NEW HAMPSHIRE.

TRACTION-BELT MECHANISM.

Application filed September 9, 1924. Serial No. 736,672.

This invention relates to a novel and improved traction belt or chain for land vehicles. The invention will be best understood by reference to the following description when taken in connection with the accompanying drawings of one specific embodiment thereof, while its scope will be more particularly pointed out in the appended claims.

In the drawings:

Fig. 3 is a plan similar to Fig. 2 but showing that side of the chain which is presented to the ground;

Figure 2:
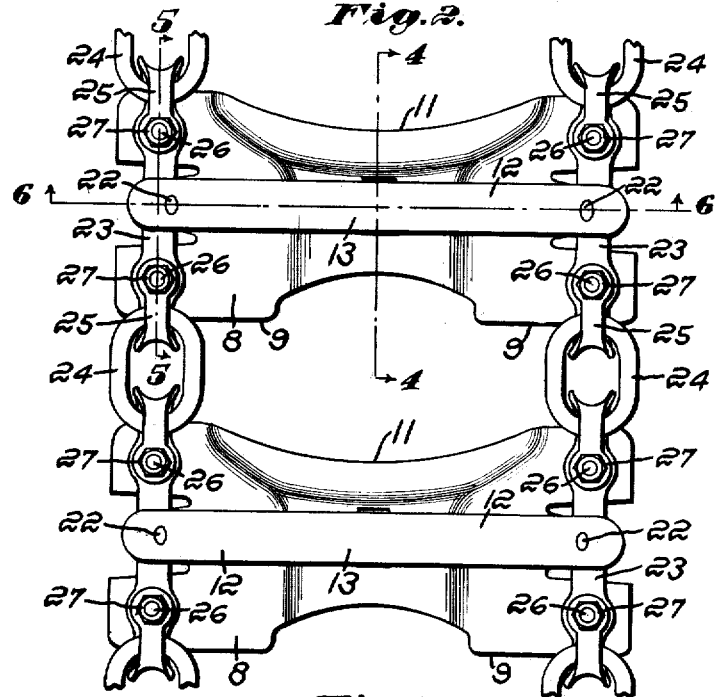
Fig. 2 is a plan on an enlarged scale of a portion of the chain as viewed from the side which is presented to the wheel or wheels.

Referring to the drawings and to the embodiment of the invention which is selected for exemplification, the belt comprises a series of tread-pieces or cleats 8 (see Figs. 2 and 3) for engagement with the snow, ice or earth along which the vehicle is to travel. These tread-pieces have suitable means to prevent slippage on the ground and herein are conveniently made of pressed sheet metal having along one edge two depending flanges 9 separated from each other by a space 10, while along the opposite edge is a flange 11, the principal portion of which is disposed across said space (see Fig. 7), that is to say, the flanges are arranged in what may be termed a staggered formation to minimize or to prevent the caking or accumulation of snow or earth which might otherwise occur. These flanges, moreover, constitute reinforcing ribs which impart great strength to the tread-piece, and in this connection it should be noted that the flange 11 (see Fig. 6), although narrowed towards its ends, nevertheless extends throughout the length of the tread-piece and consequently greatly stiffens the same. As viewed from one end, the flanges on opposite edges diverge somewhat (see Fig. 5). This formation allows any accumulations of snow or earth to free themselves readily.

Figure 1:
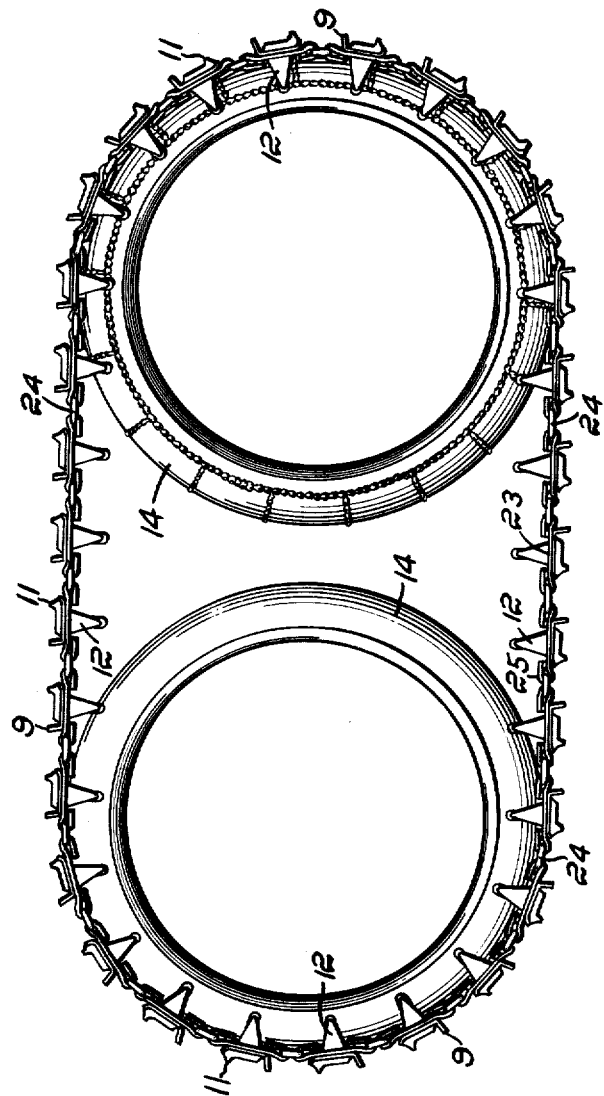
Fig. 1 is a side elevation of a traction chain embodying the invention as applied to and connecting two wheels of a land vehicle.

In the present example engagement of the chain with the perimeter of the wheel is by means of yokes, each comprising a ribbed wheel-engaging bar 12 having a depression 13 which receives the tread of the wheel tire 14 (see Fig. 1), the shape of the bar being such that its upwardly inclined terminal portions embrace the sides of the tire. This bar in the present embodiment is appropriately ribbed to give it maximum strength with minimum weight and herein is a channel bar provided with two ribs or flanges 15 which are separated by a channel or groove 16.

This bar is conveniently secured to the tread-piece as by plugs 17 (see Fig. 4) formed on its central portion extending through perforations 18 provided in the tread-piece, said plugs being clinched over beneath the tread-piece to prevent disengagement therefrom. In this way the bar is securely attached to the tread-piece. The tread-piece and its yoke are further strengthened by providing the latter with a raised rib 19 extending lengthwise of the bar and having a considerable portion received in and snugly fitting the groove 16, said rib to this end having a depressed portion 20 (see Fig. 6) corresponding in curvature to the central portion of the bar.

Figure 6:
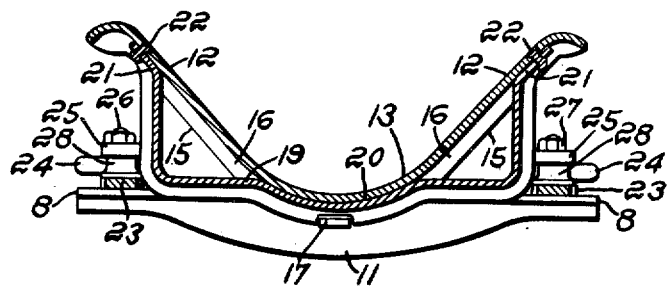
Fig. 6 is a sectional view on line 6—6 of Fig. 2.
Figure 7:
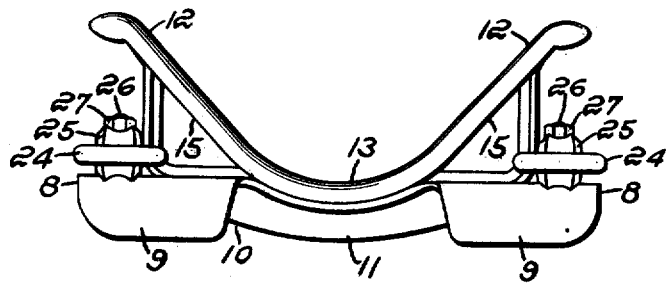
Fig. 7 is an end elevation of one of the traction belt sections.

The rib 19 extends a considerable distance along the tread-piece and therefore greatly strengthens the latter; it is also extended generally perpendicular to the tread-piece to present braces 21, the terminal portions of which are received in the groove 16 of the channel bar 12 and are suitably secured to the latter as by rivets 22. These braces are conveniently formed as integral parts of the tread-pieces themselves as by punching the blanks to form tongues which are then struck up, as shown in Fig. 6. Thus it is evident that the entire structure of the tread-piece and its yoke possesses great strength coupled with comparatively light weight.

Figure 5:
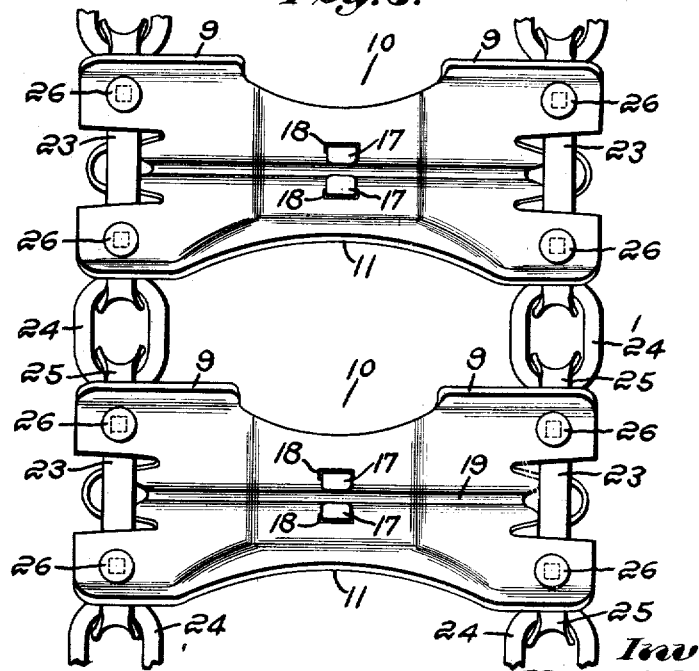
Fig. 5 is a sectional view on line 5—5 of Fig. 2.
Figure 4:
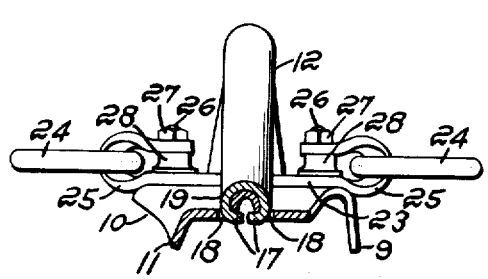
Fig. 4 is a sectional view on line 4—4 of Fig. 2.
Figure 5:
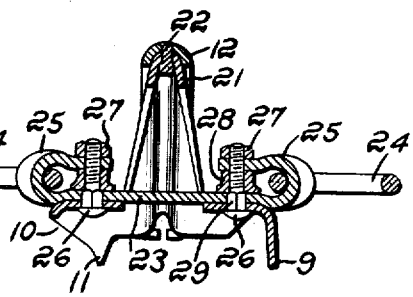

The tread-pieces are connected to one another by a chain now to be described, reference being had to Figs. 4 and 5. This chain actually comprises two chains, one at each set of ends of the tread-pieces (see Figs. 2 and 3). Referring again to Figs. 4 and 5, each chain comprises a plurality of links 23 secured to the tread-pieces respectively and connected to each other by intermediate links 24. The construction of this chain and its mode of attachment to the tread-pieces is such that any link or tread-piece when greatly worn or injured in any way can be replaced with the greatest ease. To this end each of the links 23 is provided with terminal hooks 25, which receive the links 24, as best shown in Fig. 5, and these hooks are normally closed to prevent the escape of the links 24 by the provision of bolts 26, which not only perform this function but also serve to secure the links 23 to the tread-pieces, and furthermore these bolts greatly strengthen the hooks 25. Herein the bolts are ordinary round-headed carriage bolts having square shanks 29 received in correspondingly shaped perforations in the link 23 and tread-piece 8 to prevent the bolt from turning therein, thus avoiding the necessity of using a wrench at this point. The opposite end of the bolt is provided with a nut 27, while about the intermediate portion is a spacer, herein a collar 28. When the nut is screwed down, the spacer predetermines the position of the hook, thus preventing its sides from being squeezed together too far.

The connection between the links 23 and 24 is such that the chain possesses the utmost flexibility in all directions since the tread-pieces can move endwise with relation to one another as well as crosswise. This great flexibility conserves power and for this reason a greater amount of power is made effective at the ground. Moreover, more positive traction is afforded. Furthermore, the large open spaces between the tread-pieces curiously enough possess a remarkable advantage as compared with a continuous surface, namely, the vehicle does not sink into soft snow as far as is the case with one equipped with a belt having a continuous uninterrupted surface. Whatever may be the reason for this, yet it is a fact that comparative tests show this to be the case.

In some cases the traction belt may be used in the same manner as an ordinary traction chain wrapped entirely around the periphery of a wheel as a more efficient substitute for some of the more commonly employed non-skid chains. In the example shown in Fig. 1, however, the traction belt is shown connecting two wheels of a vehicle which partakes of some of the characteristics of a tractor in that a very considerable length of the belt is presented to the road surface, and it is this latter kind of installation where the chain finds its greatest field of usefulness.

Having thus described one embodiment of the invention, but without limiting myself thereto, what I claim and desire by Letters Patent to secure is:

1. In a traction belt structure, the combination of a belt, a series of tread-pieces carried by said belt, and a series of yokes carried by said belt and adapted to embrace a wheel, each yoke comprising a ribbed wheel-engaging bar, the ribs being presented outwardly.

2. In a traction belt structure the combination of a belt, a series of tread-pieces carried by said belt, and a series of yokes carried by said belt and adapted to embrace a wheel, each yoke comprising a ribbed bar and the associated tread-piece presenting a brace therefor.

3. In a traction belt structure, the combination of a belt, a series of tread-pieces carried by said belt, and a series of yokes carried by said belt and adapted to embrace a wheel, each yoke comprising a channel bar, having ribs presented outwardly, and said bar together with said tread-piece presenting a truss.

4. In a traction belt structure, the combination of a belt, a series of tread-pieces carried by said belt, and a series of yokes carried by said belt and adapted to embrace a wheel, each yoke comprising a bar secured to its associated tread-piece adjacent their central portions and adjacent their ends.

5. In a traction belt structure, the combination of a belt, a series of tread-pieces carried by said belt, and a series of yokes carried by said belt and adapted to embrace a wheel, each yoke comprising a channel bar having its central portion provided with lugs extending through and securing the means to the central portion of the associated tread-piece.

6. In a traction belt structure, the combination of a belt, a series of tread-pieces carried by said belt, and a series of yokes carried by said belt and adapted to embrace a wheel, each yoke comprising a bar having a depression received in a depression presented by the associated tread-piece.

7. In a traction belt structure, the combination of a belt, a series of tread-pieces carried by said belt, and a series of yokes carried by said belt and adapted to embrace a wheel, each yoke comprising a channel bar having a depression and the associated tread-piece having a depression, the depression of one being received in the depression of the other, and a portion of the associated tread-piece being received in the channel of said bar.

8. In a traction belt, the combination of a series of tread-pieces, each having along one edge a plurality of ground-engaging, transverse flanges separated by a space, and along its opposite edge a ground-engaging, transverse flange in registration with said space, and a flexible connection between said tread-pieces.

9. In a traction belt, the combination of a series of tread-pieces, each having along one edge a plurality of ground-engaging, transverse flanges separated by a space, and along its opposite edge a ground-engaging, transverse flange in registration with said space, and a flexible connection between said tread-pieces, the last-mentioned flange having a maximum depth along its central portion and tapering toward the ends of said tread-piece.

10. In a traction belt, the combination of a series of tread-pieces, each having along one edge a plurality of ground-engaging, transverse flanges separated by a space, and along its opposite edge a ground-engaging, transverse flange in registration with said space, and a flexible connection between said tread-pieces, the last-mentioned flange having a maximum depth along its central portion in registration with said space and having a minimum depth along its terminal portions in registration with the first-mentioned flanges, the first-mentioned flanges having a substantially uniform depth throughout the greater portion of their length.

In testimony whereof, I have signed my name to this specification.

VIRGIL D. WHITE.

verse flange in registration with said space, and a flexible connection between said tread-pieces.

9. In a traction belt, the combination of a series of tread-pieces, each having along one edge a plurality of ground-engaging, transverse flanges separated by a space, and along its opposite edge a ground-engaging, transverse flange in registration with said space, and a flexible connection between said tread-pieces, the last-mentioned flange having a maximum depth along its central portion and tapering toward the ends of said tread-piece.

10. In a traction belt, the combination of a series of tread-pieces, each having along one edge a plurality of ground-engaging, transverse flanges separated by a space, and along its opposite edge a ground-engaging, transverse flange in registration with said space, and a flexible connection between said tread-pieces, the last-mentioned flange having a maximum depth along its central portion in registration with said space and having a minimum depth along its terminal portions in registration with the first-mentioned flanges, the first-mentioned flanges having a substantially uniform depth throughout the greater portion of their length.

In testimony whereof, I have signed my name to this specification.

VIRGIL D. WHITE.

Certificate of Correction.

It is hereby certified that in Letters Patent No. 1,587,262, granted June 1, 1926, upon the application of Virgil D. White, of West Ossipee, New Hampshire, for an improvement in "Traction-Belt Mechanisms," an error appears in the printed specification requiring correction as follows: Page 2, line 104, claim 5, for the word "means" read *same;* and that the said Letters Patent should be read with this correction therein that the same may conform to the record of the case in the Patent Office.

Signed and sealed this 20th day of July, A. D. 1926.

[SEAL.]
M. J. MOORE
*Acting Commissioner of Patents.*

Certificate of Correction.

It is hereby certified that in Letters Patent No. 1,587,262, granted June 1, 1926, upon the application of Virgil D. White, of West Ossipee, New Hampshire, for an improvement in "Traction-Belt Mechanisms," an error appears in the printed specification requiring correction as follows: Page 2, line 104, claim 5, for the word "means" read *same;* and that the said Letters Patent should be read with this correction therein that the same may conform to the record of the case in the Patent Office.

Signed and sealed this 20th day of July, A. D. 1926.

[SEAL.]

M. J. MOORE
*Acting Commissioner of Patents.*